United States Patent [19]

Concha et al.

[11] 4,297,068
[45] Oct. 27, 1981

[54] CARGO CONTAINER TRANSPORTER

[75] Inventors: Edward Concha, Santa Barbara; Max Jaffe, Pacific Palisades; Riley Bedford, Torrance, all of Calif.

[73] Assignee: The United States of America as represented by the Secretary of the Army, Washington, D.C.

[21] Appl. No.: 77,862

[22] Filed: Sep. 21, 1979

[51] Int. Cl.³ .............................................. B60P 3/40
[52] U.S. Cl. ................................... 414/458; 254/45; 280/43.1; 280/43.2
[58] Field of Search .................... 414/458; 280/43.24, 280/43.1, 43.23, 43.2, 35; 254/45, 47, 48, 7 C, 7 R, 2 R, 2 C, 4 C, 4 R; 187/9 R, 9 E

[56] References Cited

U.S. PATENT DOCUMENTS

| 2,541,298 | 2/1951 | Shaffer | 187/9 R X |
| 3,082,891 | 3/1963 | Hessler et al. | 187/9 R X |
| 3,631,999 | 1/1972 | Walerowski | 414/458 |
| 3,666,046 | 5/1972 | Meinecke, Jr. | 187/9 E X |

FOREIGN PATENT DOCUMENTS 612900 6/1978 U.S.S.R. ............................ 187/9 R

Primary Examiner—Joseph F. Peters, Jr.
Assistant Examiner—Milton L. Smith
Attorney, Agent, or Firm—Peter A. Taucher; John E. McRae; Nathan Edelberg

[57] ABSTRACT

A wheeled transporter attachable to a multi-ton cargo container for lifting and lowering said container, and moving same overland. The transporter includes separate transporter units attachable to each end of the container for building a trailer unit. Each unit is structured to permit high wheel travel for improved operation over rough terrain.

1 Claim, 8 Drawing Figures

CARGO CONTAINER TRANSPORTER

The invention described herein may be manufactured, used and licensed by or for the Government for governmental purposes without payment to us of any royalty thereon.

BACKGROUND AND SUMMARY OF THE INVENTION

It is known to provide cargo container transport units, sometimes termed dollies, that are attachable to each end of a multi-ton cargo container. Examples of such units are shown in U.S. Pat. No. 2,968,490 to Baus, U.S. Pat. No. 3,131,950 to Weaver et al, U.S. Pat. No. 3,243,193 to Fulmer et al, and U.S. Pat. No. 3,386,747 to Watt. These patented devices are suitable for transporting containers on smooth surfaced highways, but they are not completely satisfactory for use on rough terrain because they are designed to have relatively small wheel travel and high rate suspension mechanisms. The present invention is directed to a wheeled transporter designed to include trailing arms for the ground-engaged wheels, and resilient spring means trained between the transporter frame and the rear end of each trailing arm; the transporter unit is designed for high wheel travel and low rate spring suspension, thus adapting itself for use on rough terrain.

IN THE DRAWINGS

Figure 1:
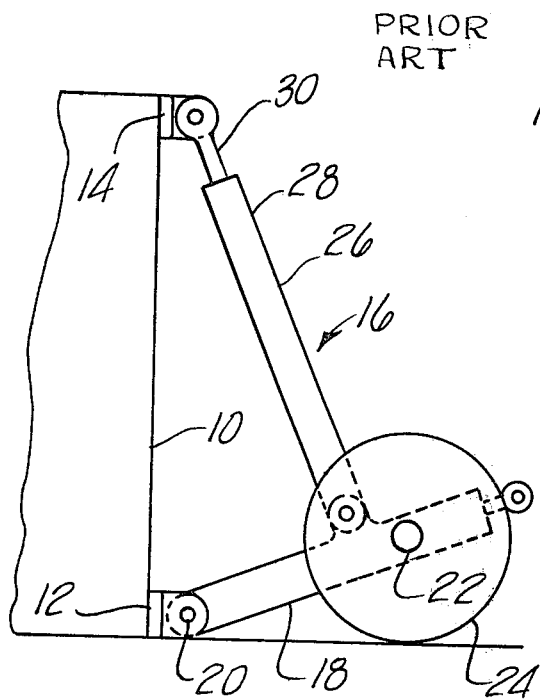
FIGS. 1 and 2 are side elevational views, largely schematic, of a conventional prior art cargo container transporter unit, showing said unit in a lowered condition for connection to a container at ground level and after the container has been raised to the transport position.
Figure 2:
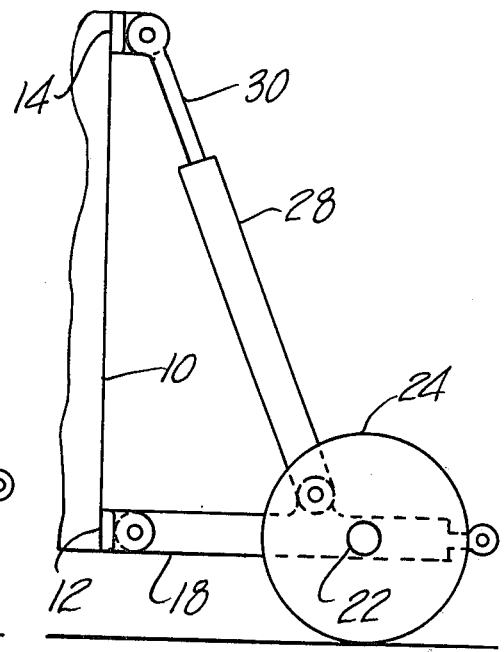

Referring more particularly to FIGS. 1 and 2, there is shown therein a prior art transporter connectable to one end of a rectangular freight container 10 that is normally approximately eight feet high and eight feet wide. The length of the container can usually be either twenty feet or ten feet or six foot eight inches (a one-third multiple of the twenty foot container). These containers usually carry up to twenty tons total weight. The eight corners for the container are provided with cast metal fittings having slot openings for receiving twist locks carried by lifting beams. FIGS. 1 and 2 show a lifting beam 12 attached to the container 10 at its lower edge and a second lifting beam 14 attached to the container at its upper edge; each beam is eight feet long to span the width of the container.

The cargo container transporter, designated generally by numeral 16, comprises a rectangular frame 18 pivotally attached at 20 to the lower lift beam 12 and provided with laterally spaced bearings for a transverse axle 22 that mounts conventional rubber-tired wheels 24. Trained between frame 18 and the lifting beam 14 are two laterally-spaced hydraulic struts 26, each including a cylinder 28 and piston rod 30. Introduction of pressurized hydraulic fluid into the lower end of cylinder 28 causes piston rod 30 to be extended from cylinder 28, thereby imparting a lift action to beam 14 and the attached container 10. When the mechanism assumes the FIG. 2 container-elevated position the mechanism can be towed overland. It will be understood that a transporter 16 is positioned at each end of container 10 preparatory to the container-lift operation. The hydraulic struts for these transporters may be actuated separately or simultaneously.

Figure 3:
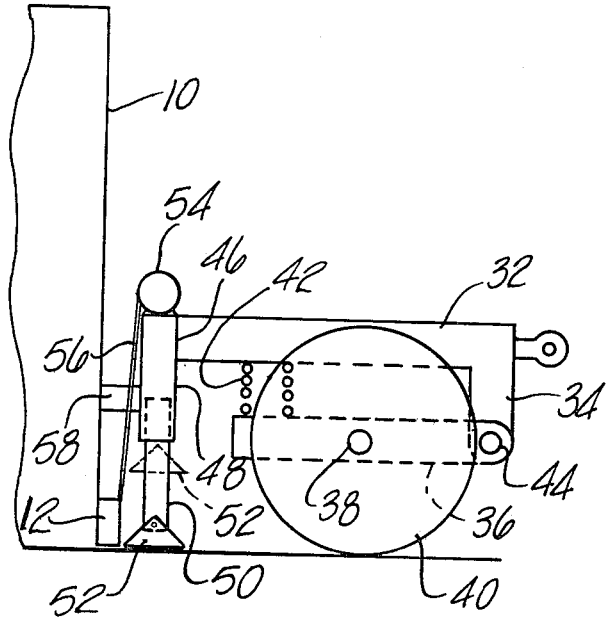
FIGS. 3 and 4 are similar views of a transporter constructed according to the present invention.
Figure 4:
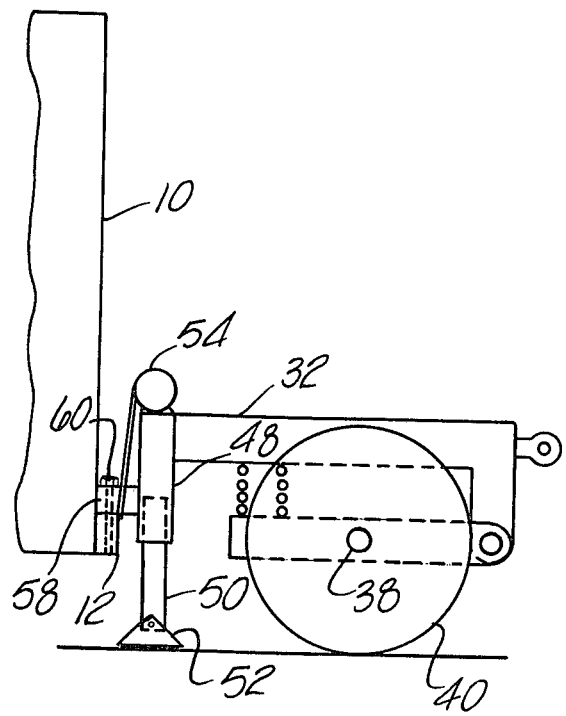

The FIG. 1 prior art mechanism is not adapted for large travel of wheels 24 in the rebound-jounce directions. Therefore the mechanism is not particularly suited for use in transporting military cargo containers over rough terrain. FIGS. 3 and 4 illustrate the transporter mechanism that we have devised to improve the wheel travel and usability of the transporter on rough terrain. The mechanism comprises a rectangular frame 32 having a depending section structure 34 at one end for swingably mounting a pair of trailing arms 36. The trailing arms mount an axle means 38 for the rubber-tired ground wheels 40. If the trailing arms are independently suspended then each arm will have a separate axle 38, whereas if a beam axle suspension is used then a single axle extending between the two trailing arms will be employed. Trained between frame 32 and the rear end of each trailing arm 36 is a compression coil spring 42. The suspension system is especially designed for large wheel travel around the swing axis 44.

The frame 32 is maintained in a level horizontal attitude during a container-lift operation due to the presence of an extensible-retractible leg means 46, comprised of two vertical tubular elements 48 mounted on frame 32 at its rear corners, a piston-like leg element 50 telescoped into each tube 48, and a large area foot 52 having a pendulum connection with the lower end of each leg element 50. The leg elements 50 are retracted upwardly into the tubes 48 when it is desired to move the transporter overland and are extended downwardly from the tubes 48 when it is desired to lift or lower the container 10. Suitable latches or locks, not shown, are provided to retain the leg elements 50 in their retracted or extended positions.

To achieve a container lift action there is provided a winch means 54 mounted on frame 32 and having two laterally-spaced cables 56 connected to the lifting beam 12. Manual or powered rotation of winch means 54 causes the cables 56 to wind onto the winch drum, or drums, to raise the container 10 to the FIG. 4 position wherein the lifter beam 12 underlies a section 58 of the frame 32. Bolts 60 can be extended through aligned holes in elements 12 and 58 to provide a rigid connection between the container and frame 32.

Figure 5:
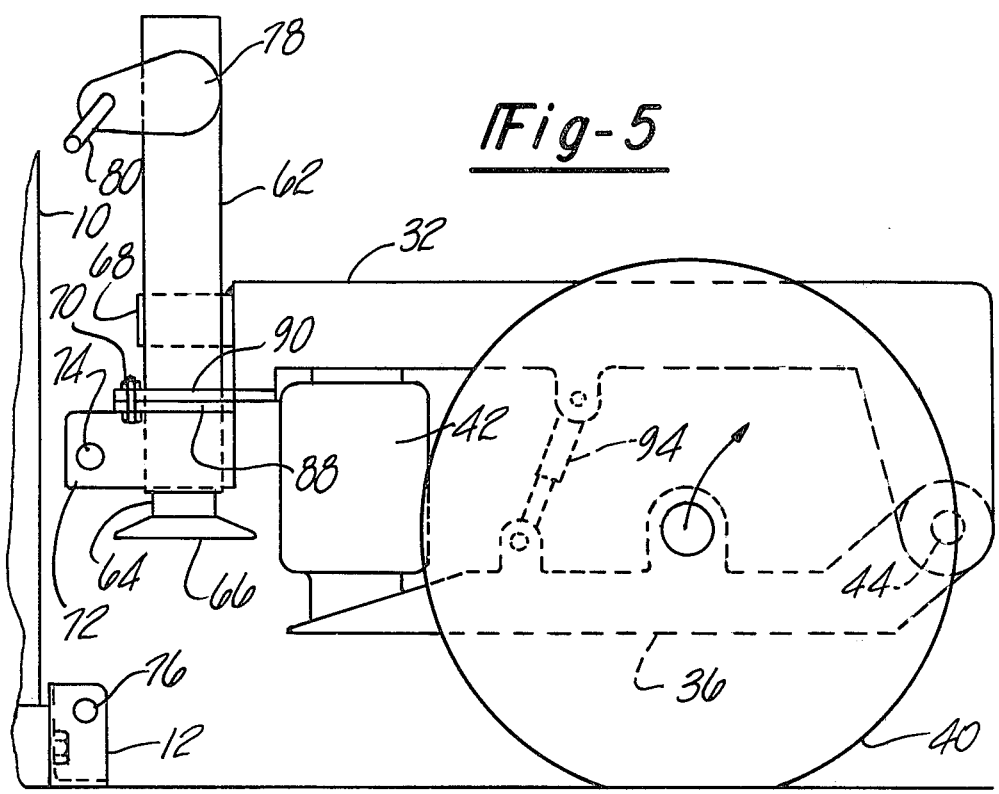
FIGS. 5, 6 and 7 are side elevational views of another embodiment of this invention illustrating the operation of a landing leg and container lift mechanism utilized therein.
Figure 6:
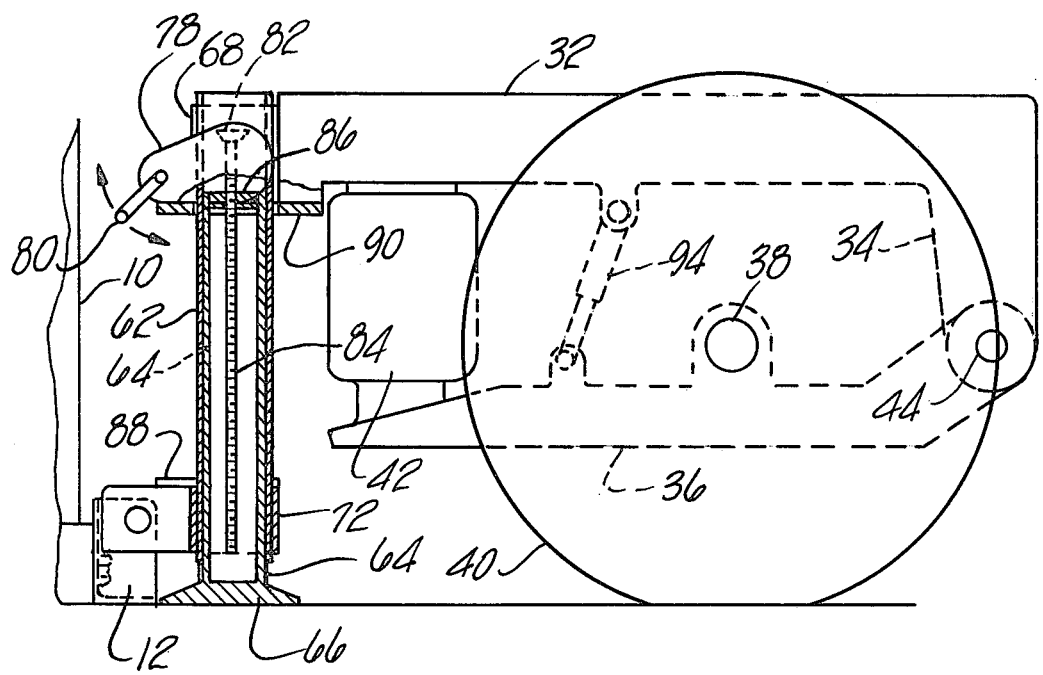
Figure 7:
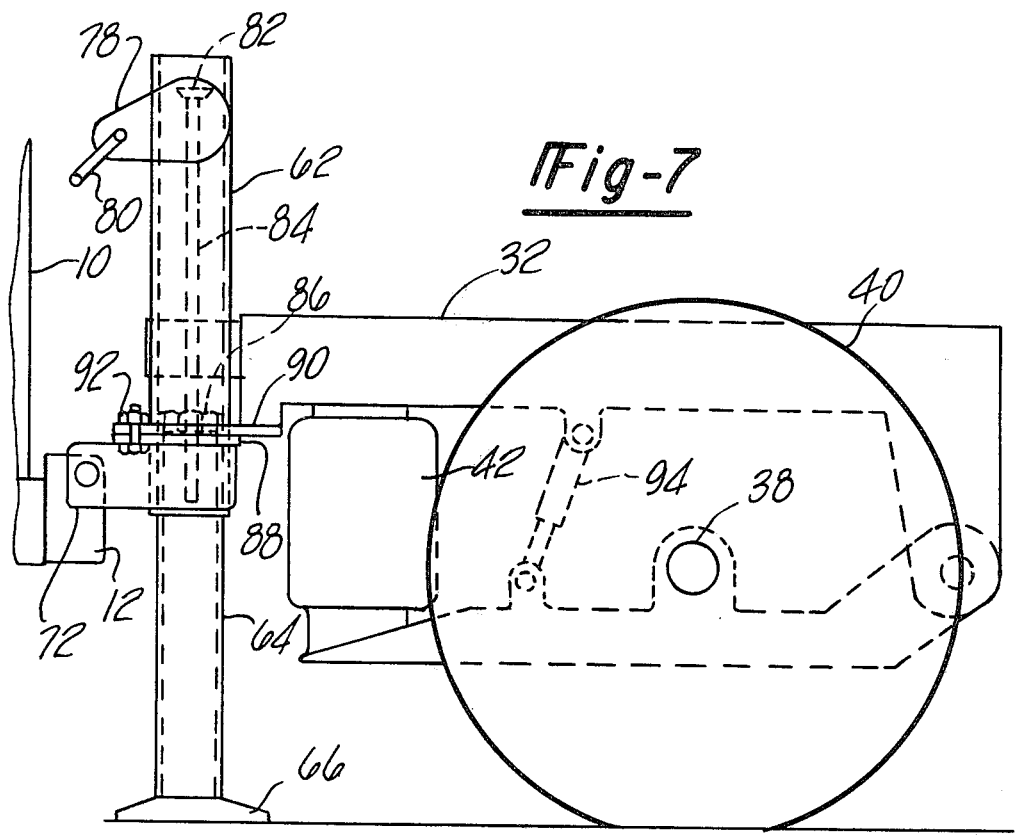

FIGS. 5, 6 and 7 illustrate a variant of the invention wherein the container lift means is incorporated into the landing leg means. In this case each landing leg means comprises an outer square tube 62, an inner square tube 64 and a ground-engagement foot 66 secured to tube 64. Each tube 62 is slidably adjustable within a guide structure 68 carried by frame 32 so that tube 62 can be moved from its FIG. 5 elevated position downwardly to its FIG. 6 lowered position. A bolt mechanism 70 may be used to retain the tube 62 in its FIG. 5 elevated position during the periods when the transporter is being towed.

Each tube 62 carries a bracket 72 having a transverse hole 74 therein. When the landing legs are lowered to the FIG. 6 position the holes in the brackets 72 align with holes 76 in the lifting beam 12. A bolt or pin can then be inserted through the aligned openings to rigidly lock the brackets 72 to the lifting beam 12.

As best shown in FIGS. 6 and 7 each tube 62 carries a gear reduction mechanism 78 whose input gear is connected to a manually turnable crank arm 80. The output reduction gear consists of a large bevel gear that meshes with a small bevel gear 82 connected to a vertical screw 84 that runs through a nut 86 suitably secured in the upper end of tube 64. Assuming the mechanism is in the FIG. 6 position, manual rotation of crank 80 causes screw 84 to turn around its longitudinal axis, thereby advancing the screw 84 upwardly through the stationary nut 86. This action lifts the container 10 to the FIG. 7 position wherein plate portion 88 of bracket 72 abuts the undersurface of plate 90 carried by frame 32. With the components in the FIG. 7 position bolts 92 can be extended through aligned openings in plates 88 and 90, thus providing a rigid connection between container 10 and frame 32.

In the towing mode the mechanism of FIG. 7 functions similar to the FIG. 3 mechanism. Structurally the FIG. 7 system differs from FIG. 3 in that an airbag 42 is used for the resilient suspension function. Also, the FIG. 7 system incorporates a conventional shock absorber 94 between the frame 32 and trailing arm 36. This shock absorber may be any conventionally available commercial device such as an air-over-oil type or an all-hydraulic type.

Figure 8:
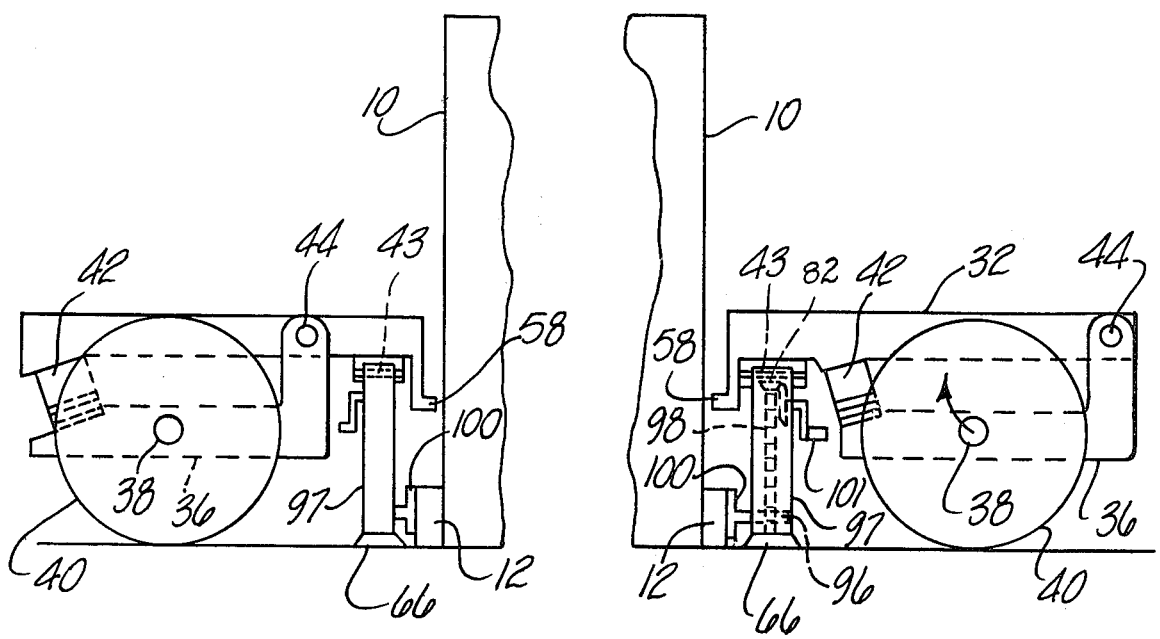
FIG. 8 is a side elevational view illustrating a still further embodiment of this invention.

FIG. 8 shows the front and rear ends of a cargo container 10, and the relationship to the front and rear transporters. The system of FIG. 8 embodies the same general overall arrangement previously described. In this case the trailing arm 36 is provided with an upwardly directed section so that the swing axis 44 is located in the general plane of frame 32. Also, the suspension spring takes the form of a leaf spring 42 arranged transversely of the frame, with its midpoint secured to frame 32 and with its ends engaged against respective ones of trailing arms 36. The landing leg means comprises two individual landing legs at the corners of frame 32, each landing leg having a pivotal connection 43 with the frame 32 whereby the individual legs can swing in a transverse direction (normal to the plane of the paper) between retracted positions elevated above the ground and lowered positions engaged with the ground surface. Each landing leg may comprise a square hollow tube 97 that serves as a guide means for a square nut 96 that is arranged to move up and down on a rotary screw 98 mounted within the tube. Rotation of the screw 98 may be accomplished by a manual crank 101 geared to a bevel gear 82 carried by the screw. Nut 96 is connected to a bracket 100 adapted to be bolted or otherwise secured to lifting beam 12 for raising container 10. Each tube 97 is provided with a slot to accommodate the connection between nut 96 and bracket 100.

The various embodiments of this invention shown in the drawings are believed to generally illustrate the particular features or arrangements that constitute the inventive concept. In general, the invention contemplates that the ground wheels will be connected to the frame 32 by means of trailing arms 36 having the capability for relatively large travel between the jounce and rebound positions. In each case the suspension spring means 42 is located between the rear end of the trailing arm 36 and frame 32 so that substantial deflection of the spring is obtainable, thus making possible the use of low rate spring devices. The invention contemplates that frame 32 will be maintained in a stable position during a container-lift operation by means of retractible landing legs located at the corners of the frame. The container-lift operation can be accomplished by various different jack or winch mechanisms, illustrative ones of which are shown in the drawings. Preferably each landing leg is located immediately adjacent the line of action of the container lift means to minimize moment arms between the landing leg means anchorage point and the load being lifted. The invention has for its principal objective the provision of a cargo container transporter suited for use on rough terrain where large wheel travel is necessary or at least desirable.

We wish it to be understood that we do not desire to be limited to the exact details of construction shown and described for obvious modifications will occur to a person skilled in the art.

We claim:

1. A wheeled transporter attachable to one end of a cargo container, said transporter comprising a frame (32) have a leading end and a trailing end; said frame having a depending section (34) adjacent its leading end; a pair of trailing arms (36) swingably connected to the lower end of the frame depending section for movement in vertical planes; a ground-engaged wheel having an axle mounted at an intermediate point on each trailing arm; resilient spring means (42) trained between the frame and the rear end of each trailing arm to yieldably resist movement of the wheel in an upward direction relative to the frame; two laterally spaced landing leg mechanisms carried on the frame at corner areas thereof in close adjacency to the cargo container; each landing leg mechanism including inner and outer telescoped tubes bodily adjustable as a unit between a retracted position spaced above ground level and an extended position engaged with the ground, a container lift bracket (72) carried by each outer tube at its lower end for connection with a lower corner area of the container, a nut carried on the upper end of each inner tube, a vertical screw carried by each outer tube in meshed engagement with the nut, and means (78) carried by each outer tube for rotating the associated screw to produce upward motion of the outer tube and associated lift action on the container when the leg mechanism is in its extended position; each container lift bracket being located to have a lifting line of action in the immediate vicinity of the associated landing leg mechanism whereby the landing leg mechanism effectively absorbs the container load.

* * * * *